United States Patent
Gau et al.

(10) Patent No.: US 10,853,430 B1
(45) Date of Patent: *Dec. 1, 2020

(54) AUTOMATED AGENT SEARCH ENGINE

(71) Applicant: AMERICAN INNOVATIVE APPLICATIONS CORPORATION, Clarksville, VA (US)

(72) Inventors: Shane Gau, Clarksville, VA (US); James Moody, Clarksville, VA (US)

(73) Assignee: American Innovative Applications Corporation, Clarksville, VA (US)

( * ) Notice: Subject to any disclaimer, the term of this patent is extended or adjusted under 35 U.S.C. 154(b) by 246 days.

This patent is subject to a terminal disclaimer.

(21) Appl. No.: 15/808,597

(22) Filed: Nov. 9, 2017

Related U.S. Application Data

(60) Provisional application No. 62/421,670, filed on Nov. 14, 2016, provisional application No. 62/421,763, filed on Nov. 14, 2016.

(51) Int. Cl.
*G06F 16/00* (2019.01)
*G06F 16/9535* (2019.01)
*G06F 16/958* (2019.01)

(52) U.S. Cl.
CPC ........ *G06F 16/9535* (2019.01); *G06F 16/958* (2019.01)

(58) Field of Classification Search
CPC ........................... G06F 16/958; G06F 16/9535
See application file for complete search history.

(56) References Cited

U.S. PATENT DOCUMENTS

| | | | |
|---|---|---|---|
| 2001/0054020 A1 | 12/2001 | Barth et al. | |
| 2010/0223261 A1* | 9/2010 | Sarkar | G06Q 30/02 707/726 |
| 2013/0212081 A1 | 8/2013 | Shenoy et al. | |
| 2015/0066890 A1 | 3/2015 | Pearcy | |
| 2015/0227268 A1* | 8/2015 | Rathod | G06Q 10/00 715/739 |
| 2015/0379141 A1 | 12/2015 | Stouffer et al. | |
| 2016/0147897 A1 | 5/2016 | Dou et al. | |
| 2017/0180284 A1* | 6/2017 | Smullen | H04L 67/322 |
| 2017/0249387 A1* | 8/2017 | Hatami-Hanza | G06N 5/02 |
| 2018/0107697 A1 | 4/2018 | Tariq et al. | |
| 2018/0115599 A1 | 4/2018 | Bhat et al. | |
| 2018/0131643 A1* | 5/2018 | Trufinescu | H04L 51/02 |
| 2018/0212904 A1* | 7/2018 | Smullen | H04L 51/02 |
| 2019/0370615 A1* | 12/2019 | Murphy | G06K 9/6217 |

* cited by examiner

*Primary Examiner* — Leslie Wong
(74) *Attorney, Agent, or Firm* — Foley & Lardner LLP

(57) ABSTRACT

The method and system disclosed herein allow users to make an online query prompting a search bot to communicate with other bots in a bot directory for retrieving suitable content presented to the users. Each bot in the bot directory may retrieve bot content from a bot resources repository, but may also crawl web servers in order to look for supplementary bot content. Similarly, the search bot may analyze the search result and (if the search result is not suitable) retrieve supplementary bot content from bots found in external sources or web crawl in order to supplement the search result with additional information.

20 Claims, 11 Drawing Sheets

AUTOMATED AGENT SEARCH ENGINE

CROSS-REFERENCE TO RELATED APPLICATIONS

This application claims priority to U.S. Provisional Patent Application Ser. No. 62/421,670, filed on Nov. 14, 2016, and U.S. Provisional Patent Application Ser. No. 62/421,763, filed on Nov. 14, 2016, all of which are hereby incorporated by reference in their entirety.

TECHNICAL FIELD

The present invention generally relates to computer software, and more specifically to a system and method for allowing users to interact with automated search agents (bots) through virtual integration with an online search engine.

BACKGROUND

In order to increase business efficiency and customer satisfaction, some businesses may utilize an automated conversation agent (e.g., bot, chatbot, or an automated search engine), implemented by a computer program with a suitable backend to provide content (information or services) to users. Bots typically support interactions with users by using locally available resources, or by accessing remote resources with which they may interact through application programming interfaces (APIs). Furthermore, by providing a natural language interaction, bots provide a positive and user-friendly experience. Bots may appear as a contact on one or more presence-based networks, which are the networks that define the availability and receptivity of contacts to engage in real-time communications. Currently, these bots are primarily found on instant messaging networks, but can also be found on Voice over Internet Protocol and other presence-based networks.

While bots are proving to be valuable sources of content for many users, finding them may be difficult. For example, user may need to utilize a conventional search engine to search for a desired bot, which may not desirable because, as described above, conventional search engines do not provide the same convenient and positive user experience as search bots themselves. Conventional search engines only provide an index of all available bots and do not enable users to link to or start an interaction with their desired bots. Moreover, current search engines do not enable an easy organization and sorting of available bots. Therefore, there is a current need for improvement of search engines and classification methods to provide users with easier access to bots.

Furthermore, while bots are proving to be valuable sources of content for many users, current bot technology may be limited to provide bot content for which they have been programmed and may restrict the bot to provide only a pre-selected category of information to the users. For example, a bot that is functionally controlled by a data source may be limited to that data source and may be restricted from providing relevant search result if the search result does not belong to said data source. Conventional and existing bot technology does not enable bots to communicate with other bots in order to aggregate content to be provided to users and ultimately increase quality and range of content.

SUMMARY

For the aforementioned reasons, there is a desire for a more efficient and accurate system and method for connecting users with multiple automated search engines. There is a desire to enable communication between bots in an attempt to improve quality and range of bot content to be delivered to users. As described herein, a central server controls a bot search engine that allows users to search for bots and directly interact with them. This bot search engine, or search bot, may simplify the process of finding and retrieving bots, giving users an opportunity to easily find useful bot content by interacting with bots provided in the search results. Moreover, the layout and features of the search bot described herein allow for an indexed sorting and categorization of bots, a search by keywords, and a display of bots by popularity or by bots of the day possible, giving users serveral options to find suitable content.

According to an embodiment, a computer-implemented method for querying a network using one or more automated search engines using an automated agent search engine comprises continuously monitoring and identifying, by a server, a plurality of automated search engines within a network, wherein each automated search engine is configured to query the network for content corresponding to a search term; compiling, by the server, a set of attributes corresponding to each respective automated search engine within the plurality of automated search engines; generating, by the server, an index table comprising the plurality of the automated search engines and their respective set of attributes; receiving, by the server, from a client computing device operated by a user and via an application executing on the client computing device, a request to query a search string from the network, wherein the search string comprises a first plurality of alphanumerical characters arranged in a manner consistent with a dialog; upon receiving the request, instructing, by the server, the application to render a graphical user interface on the client computing device comprising at least a first graphical user interface component configured to receive the search string and at least a second graphical user interface component configured to receive a second set of attributes corresponding to at least one automated search engine within the plurality of automated search engines; upon receiving the second set of attributes corresponding to at least one automated search engine from the client computing device via the graphical user interface rendered by the application, selecting, by the server, from the index table, a first automated search engine from the plurality of automated search engines with a first set of attributes that corresponds to the second set of attributes received from the client computing device via the graphical user interface; upon receiving the search string from the client computing device via the first graphical user interface component the graphical user interface rendered by the application, transmitting, by the server, an instruction to the first automated search engine to query the network for the search string; receiving, by the server, a response string from the first automated search engine, wherein the response string comprises a second plurality of alphanumerical characters arranged in the manner consistent with the dialog; and instructing, by the server, the application to update the first graphical user interface component of the graphical user interface displayed on the client computing device to display the response string.

In another embodiment, a computer system comprises a client computing device operated by a user configured to execute an application and receive, via the application, a request to query a search string from the network, wherein the search string comprises a first plurality of alphanumerical characters arranged in a manner consistent with a dialog; and transfer the search string to a server; a plurality of automated search engines within a network, wherein each automated search engine is configured to query the network for content corresponding to a search term; a server coupled to the plurality of automated search engines, the application, and the client computing device, wherein the server comprises a processor and a non-transitory computer readable medium comprising instructions that are configured to be executed by the processor to continuously monitor and identify the plurality of automated search engines within the network; compile a set of attributes corresponding to each respective automated search engine within the plurality of automated search engines; generate an index table comprising the plurality of the automated search engines and their respective set of attributes; receive, from the client computing device operated by the user and via the application executing on the client computing device, the request to query the search string; instruct the application to render a graphical user interface on the client computing device comprising at least a first graphical user interface component configured to receive the search string and at least a second graphical user interface component configured to receive a second set of attributes corresponding to at least one automated search engine within the plurality of automated search engines; upon receiving the second set of attributes corresponding to at least one automated search engine from the client computing device via the graphical user interface rendered by the application, select a first automated search engine from the plurality of automated search engines with a first set of attributes that corresponds to the second set of attributes received from the client computing device via the graphical user interface; upon receiving the search string, transmit an instruction to the first automated search engine to query the network for the search string; receive a response string from the first automated search engine, wherein the response string comprises a second plurality of alphanumerical characters arranged in the manner consistent with the dialog; and instruct the application to update the first graphical user interface component of the graphical user interface displayed on the client computing device to display the response string.

In another embodiment, a computer-implemented method for querying a network using one or more automated search engines using an automated agent search engine comprises continuously monitoring and identifying, by a server, a plurality of automated search engines within a network, wherein each automated search engine is configured to query the network for content corresponding to a search term; compiling, by the server, a set of attributes corresponding to each respective automated search engine within the plurality of automated search engines; generating, by the server, an index table comprising the plurality of the automated search engines and their respective set of attributes; receiving, by the server, from a client computing device operated by a user and via an application executing on the client computing device, a request to query a search string from the network and a second set of attributes; upon identifying a first automated search engine from the plurality of automated search engines with a first set of attributes that corresponds to the second set of attributes, transmitting, by the server, an instruction to the first automated search engine to query the network for the search string; receiving, by the server, a response string from the first automated search engine, wherein the response string comprises a plurality of alphanumerical characters arranged in the manner consistent with dialog; determining, by the server, whether the response string satisfies a threshold; when the response string satisfies the threshold: instructing, by the server, the application to update the first graphical user interface component of the graphical user interface displayed on the client computing device to display the response string; and when the response string does not satisfy the threshold: at least one of web crawling one or more webpages based on the search string, querying the one or more websites, and instructing at least a second automated search engine to search the network for the search string, receiving, by the server, a second response string to the at least one of the web crawling, querying the one or more websites, and instructing the second automated search engine, instructing, by the server, the application to update the first graphical user interface component of the graphical user interface displayed on the client computing device to display the second response string.

In another embodiment, a computer system comprises a client computing device operated by a user configured to execute an application and receive, via the application, a request to query a search string from the network, wherein the search string comprises a first plurality of alphanumerical characters arranged in a manner consistent with a dialog; and transfer the search string to a server; a plurality of automated search engines within a network, wherein each automated search engine is configured to query the network for content corresponding to a search term; a server coupled to the plurality of automated search engines, the application, and the client computing device, wherein the server comprises a processor and a non-transitory computer readable medium comprising instructions that are configured to be executed by the processor to continuously monitor and identify the plurality of automated search engines within a network; compile a set of attributes corresponding to each respective automated search engine within the plurality of automated search engines; generate an index table comprising the plurality of the automated search engines and their respective set of attributes; receive, from the client computing device, a request to query a search string from the network and a second set of attributes; upon identifying a first automated search engine from the plurality of automated search engines with a first set of attributes that corresponds to the second set of attributes, transmit an instruction to the first automated search engine to query the network for the search string; receive a response string from the first automated search engine, wherein the response string comprises a plurality of alphanumerical characters arranged in the manner consistent with dialog; determine whether the response string satisfies a threshold; when the response string satisfies the threshold: instruct the application to update the first graphical user interface component of the graphical user interface displayed on the client computing device to display the response string; and when the response string does not satisfy the threshold at least one of web crawl one or more webpages based on the search string, query the one or more websites, and instruct at least a second automated search engine to search the network for the search string, receive a second response string to the at least one of the web crawling, querying the one or more websites, and instructing the second automated search engine, instruct the application to update the first graphical user interface component of the graphical user interface displayed on the client computing device to display the second response string.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
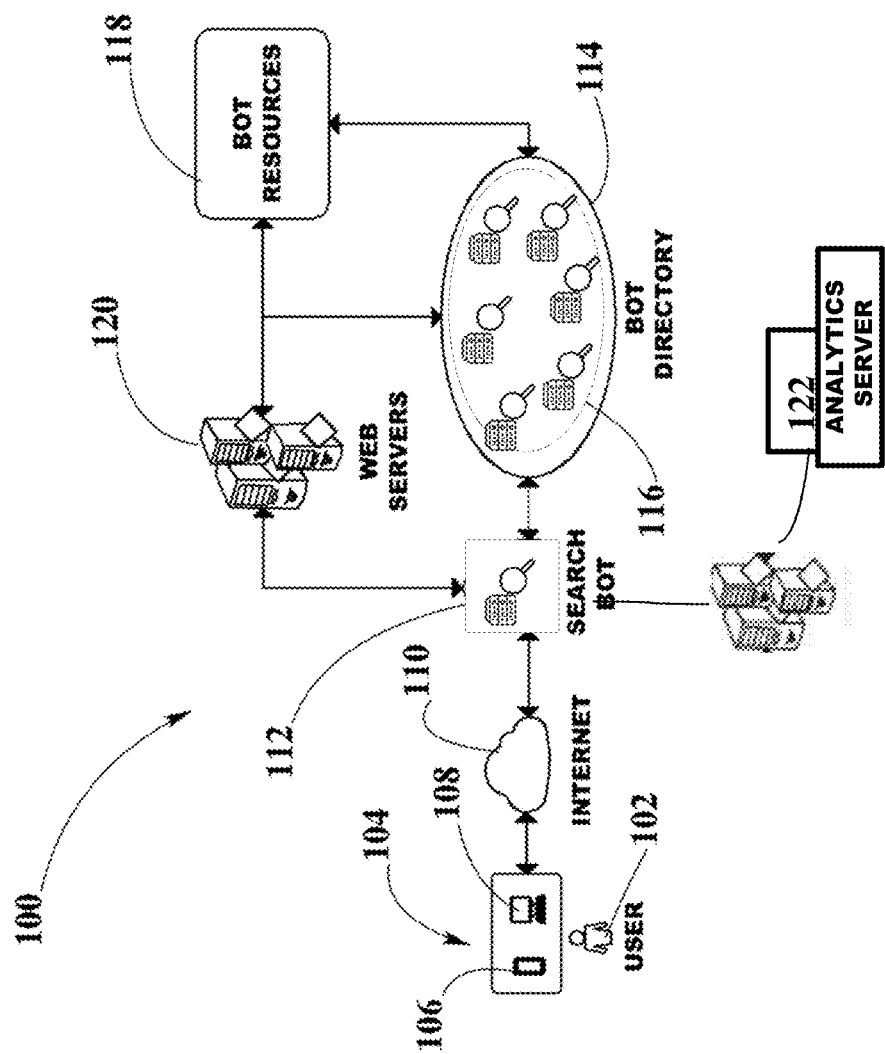
FIG. 1 illustrates an architectural diagram of an automated agent search engine system, according to an embodiment.

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 illustrates an architectural diagram of an automated search bot system 100, according to an embodiment. The term "bots" herein refers to automated agents, or computer-implemented executable modules, rather than human agents, which perform roles and engage in interactions that are otherwise analogous to human contacts. As used herein, bot, search agent, automated search agent, and search bot are used interchangeably and refer to the same concept. Hence, all communication with bots is a simulation of a human interaction defined by a natural, almost human behavior and language. These interactions typically include providing content to a user 102. The term "content" herein refers to information and services that a bot has access to and that may be provided to a computing device operated by a human user 102 as requested by said user 102. Bot content may include content related to images, videos, news, maps, hobbies, networking, virtual queues, bookings, and more. As a non-limiting example, a user 102 may interact with a bot using a natural language interface generated by the bot (or a server operationally coupled with the bot) and provide searching commands using natural language (e.g., what is the closes coffee shop?). The bot may parse the terms and conduct a search on behalf of the user 102 and provide the user 102 with results. This natural language interaction is more desirable to users because users are no longer required to provide specific search terms and may use natural language.

In FIG. 1, a user 102 may use suitable computing devices 104 including a mobile device 106 or a computing device 108 to connect a search bot 112 via communication network 110 (such as the internet, a private network, or a public network) and initiate communication with the search bot 112. The search bot 112 (also referred to as automated agent search engine) is an executable software program designed to search for information on the World Wide Web or any other network by web crawling from site to site and gathering information from each site, such as web titles, page content, JavaScript, Cascading Style Sheets (CSS), headings, standard HTML markup of the informational content, and metadata in HTML meta tags. The executable software program may also be configured to search for information by associating search terms to definable words/tokens found on web pages or domain names (e.g., indexing method). The search bot 112 is also configured to continuously search for one or more bots 116 (also referred to as automated search engines) using the above-mentioned searching techniques. The search bot 112 may display a variety of graphical user interfaces (described in FIGS. 3-7), receive search strings, and display search results by either directly searching a network (or the World Wide Web) or connecting to the bot 116 and instructing the bot 116 to conduct the search. Accordingly, the search bot 112 may either execute the above-mentioned software to search the network itself or act as middleware between the user 102 and bot 116 by delegating the search to the bot 116. The search bot 112 may be any computing device comprising a processor capable of performing the various tasks and processes described herein. The search bot 112 is functionally controlled by the analytics server 122, which is a server that controls the functionality of the search bot. Non-limiting examples of the search bot 112 may include a server, desktop, laptop, tablet, and the like. The search bot 112 comprises any number of computer-networking components, which facilitate inter-device communications via the communication network 110. One having skill in the art would appreciate that there may be any number of distinct computing devices functioning as the search bot 112 in a distributed computing environment. In operation, search bot 112 may be operationally coupled with an analytics server that is configured to control the functionality of UX and the search bot 112, communicate with the bot directory, and instruct the search bot to perform various functions requested by the user 102.

The search bot 112 may provide a graphical user interface (GUI) configured to interact with the user 102. The interaction between the search bot 112 and the user is referred hereto as user experience (UX). User experience (UX) may be provided through the computing device 108 or a mobile application executing on the mobile device 106. As described below, the user 102 may utilize a chat application and interact with the search bot 112 using natural language. Search bot 112 is configured to search in a bot directory 114 and display bots 116 to users 102 utilizing the UX. The user 102 may then select desired bots 116, transmit the user 102's request to the bots 116, and be provided with requested bot content typically retrieved from bot resources 118. The bot 116 (also referred to as an automated search engine) is a search engine that is designed to simulate conversations and interactions with users. Similar to the search bot 112, the bot 116 comprises an executable software program designed to search for information on the World Wide Web or any other network by web crawling from site to site and gathering information from each site, such as web titles, page content, JavaScript, Cascading Style Sheets (CSS), headings, standard HTML markup of the informational content, and metadata in HTML meta tags. The executable software program may also be designed to search for information by associating search terms to definable words/tokens found on web pages or domain names (e.g., indexing method). The executable software program may also conduct a conversation (e.g., present the search results) via auditory or textual methods using a variety of existing natural language processing methods, such as morphological segmentation, part-of-speech tagging, language parsing, word segmentation, natural language generation, terminology extraction, and the like. In operation, a user (such as user 102) may interact with the bot 116 through the search bot 112; the bot 116 may receive full sentences, parse the terms within the received sentence, identify the search terms, conduct a search using the above-mentioned methods, and display the search results in a full sentence that simulates a human response (e.g., conversational/natural language).

Bot resources 118 refer to a data repository that includes any functionality enabling a bot 116 to provide content to a user 102. An example of bot resources 118 may be any information gathered form the World Wide Web. In some embodiments, the bot 116 may directly search a network or the World Wide Web. According to an embodiment, in a situation where individual bots 116 are not available in bot directory 114, search bot 112 may also be configured to crawl Web resources, such as Web servers 120, for finding requested bots 116. Likewise, in an event where some bots 116 are not able to provide desired content, bot directory 114 and hence bots 116 within are also connected to web servers 120, allowing said bots 116 to crawl web sources and retrieve new bot resources 118 that may comply with user requests.

Bot directory 114 is kept constantly updated by one or more application managers (not shown) performing bot searches on web servers 120 or by the search bot 112, by automatic bot searches performed periodically on web servers 120, or by submission from users 102 sending bots 116 for review to one or more application manager.

Mobile device 106 is representative of a variety of small and portable devices including, for example, mobile phones, smart phones, PDAs (personal digital assistant), handheld game devices, portable media players, and the like. Alternatives to device 108 may include devices such as set top boxes, media centers, game consoles, and the like.

In operation, user 102 may log on to the analytics serve 122 through mobile device 106 or device 108 and get access to the search bot 112. The search bot 112 may be accessible through an application executing on the mobile device 106 operated by the user 102 or a website operated/provided by the analytics server 122. Upon being authenticated, the analytics server 122 may display a GUI (such as bot content search GUI 300). Upon the user 102 indicating a desire to conduct a search, the analytics server 122 may then render a GUI (such as search bot welcome screen 400) that provides the user 102 with multiple options to conduct a search using different bots 116. User experience (UX) of the search bot (e.g., different graphical user interfaces provided by the analytics server 122 via the website or the above-mentioned application) may be provided via a chat application or other suitable interface. The search bot 112 is connected to a bot directory 114 and to web servers 120. The bot directory 114, a compilation of bots 116 that are readily available for retrieval by search bot in case of a user request, is connected to bot resources 118, giving each individual bot functionalities needed to provide bot content to user 102. Bot directory 114, and bot resources 118 are also connected to web servers 120 for retrieving supplementary bot content as required (e.g., when the search result is not satisfactory). Likewise, search bot 112 may also retrieve supplementary bots from web servers 120. The analytics server 122 keeps the bot directory 114 constantly updated by one or more application managers performing bot searches on web servers, by automatic bot searches performed periodically on web servers 120, or by submission from user 102 (and other users) sending bots for review to one or more application manager.

The analytics server 122 (through UX) may facilitate an easier connection between the user 102 and his desired bot. The analytics server 122 may receive bot attributes, select a bot that matches those attributes, transfer the user 102's search commands to the selected bot, and display the results received from the selected bot. If the analytics server 122 determines that the search results are not adequate, the analytics server 122 may also independently search the web server 120 and/or utilize other bots within the bot directory 114 to provide supplementary content to the user 102. The above-mentioned method allows the user 102 to have access to multiple bots, conduct a search using natural language dialog, and receive content from one or more bots while using a single application (or interface) and without having to search for different bots or performing multiple searches using different individual bot interfaces. The present disclosure provides a better user experience in a post-internet world where most users require an easy-to-operate interface.

Figure 2:
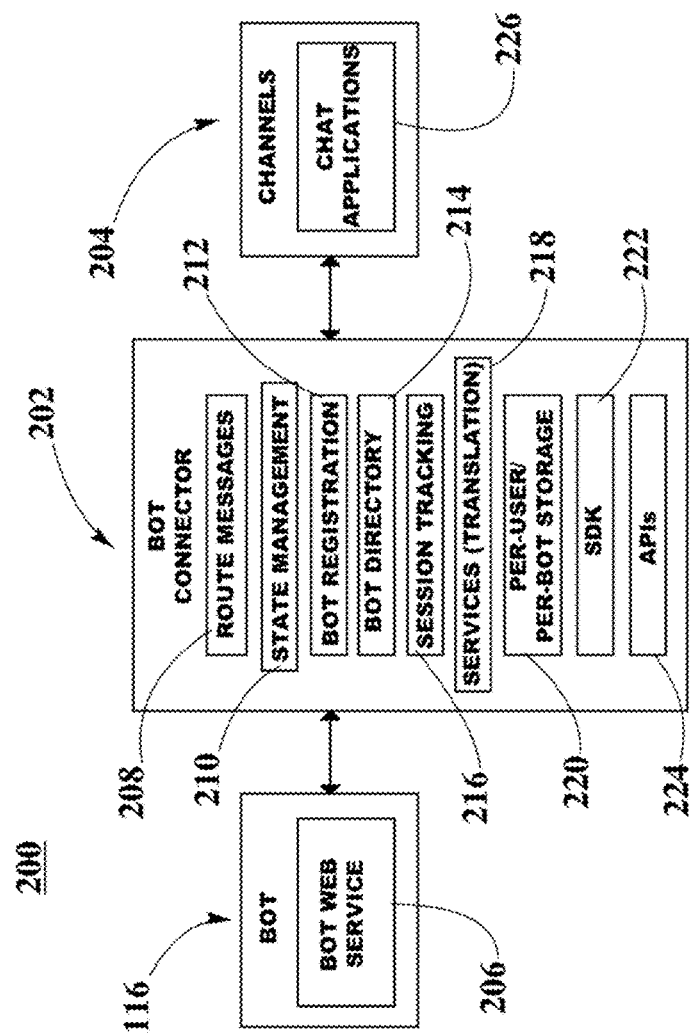
FIG. 2 illustrates a bot diagram that may be employed by the automated search engine and by each of the bots in a bot directory, according to an embodiment.

FIG. 2 illustrates a bot diagram 200 that may be employed by search bot 112 and bots 116, according to an embodiment. In FIG. 2, a bot 116 is connected to channels 204 via bot connector 202. Bot 116 may include a bot web service 206 for connection with web servers 120. Bot connector 202 may include serveral functions, such as routing messages 208 from user 102 via channels 204 to bot 116 and vice-versa; performing state management 210, meaning to manage all stored data within bot connector 202 at a given instant in time; performing bot registration 212 and managing a bot directory 214, allowing developers to release different bots 116 to the public; performing session tracking 216, which is a way to track and maintain state of a user 102; performing services 218 such as translation of text from a user 102 for clear comprehension of requests to bot 116, and translating bot 116 replies to user 102 back to original language employed by said user 102; allowing for per-user and per-bot storage 220, referring to data storage per particular user 102 related to a corresponding bot 116; enabling access to a software development kit (SDK 222), enabling development of new bots 116 and modification of existing bots 116; and allowing access to application programming interfaces (APIs 224) serving as interfaces for bots 116 and channels 204 to communicate 816, with each other and for performing standard CRUD (create, read, update, delete) operations. Channels 204 may include suitable chat applications 226 such as Facebook Messenger™, LINE™, Skype™, Slack™, Skype™ and WhatsApp™, among others.

Figure 3:
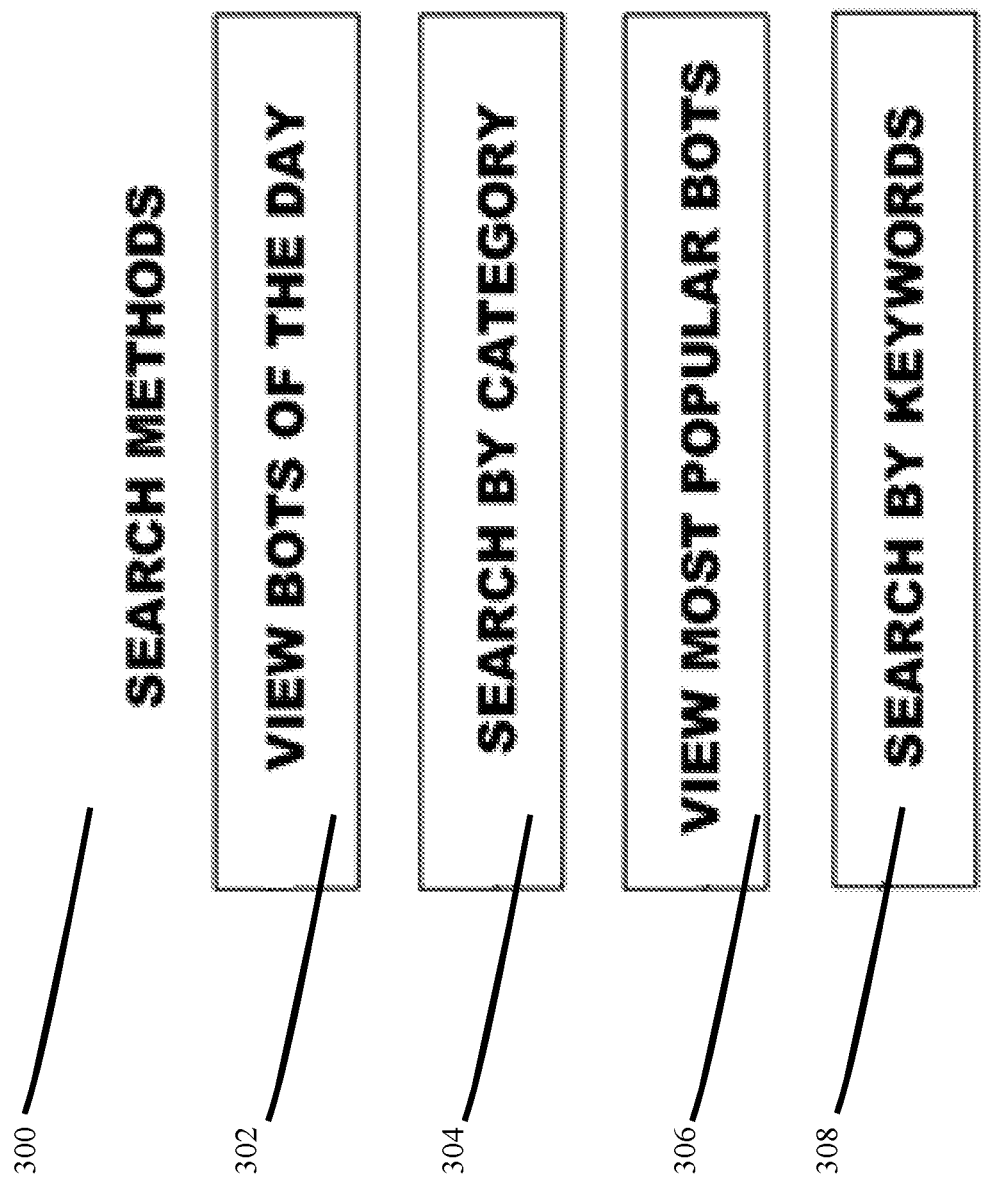
FIG. 3 illustrates bot content search methods graphical user interface, according to an embodiment.

FIG. 3 illustrates bot content search GUI 300, according to an embodiment. In FIG. 3, bots 116 are displayed based on 1) a bots of the day 302 bot compilation as selected by one or more application managers; 2) an indexed compilation of bot categories 304, displaying all available bots in a bot directory as classified in each category; 3) a most popular bots 306 bot compilation based on user curation leveraging a bot rating algorithm; or 4) a search by keywords 308 that allows users to type any query that will prompt the search bot to search within the bot directory or, if necessary, web servers in order to provide a requested bot content. In operation, a user may connect to the search bot via an application executing on a mobile device operated by the user. The search bot may display search GUI 300 and provide the user with multiple options to proceed.

Figure 4:
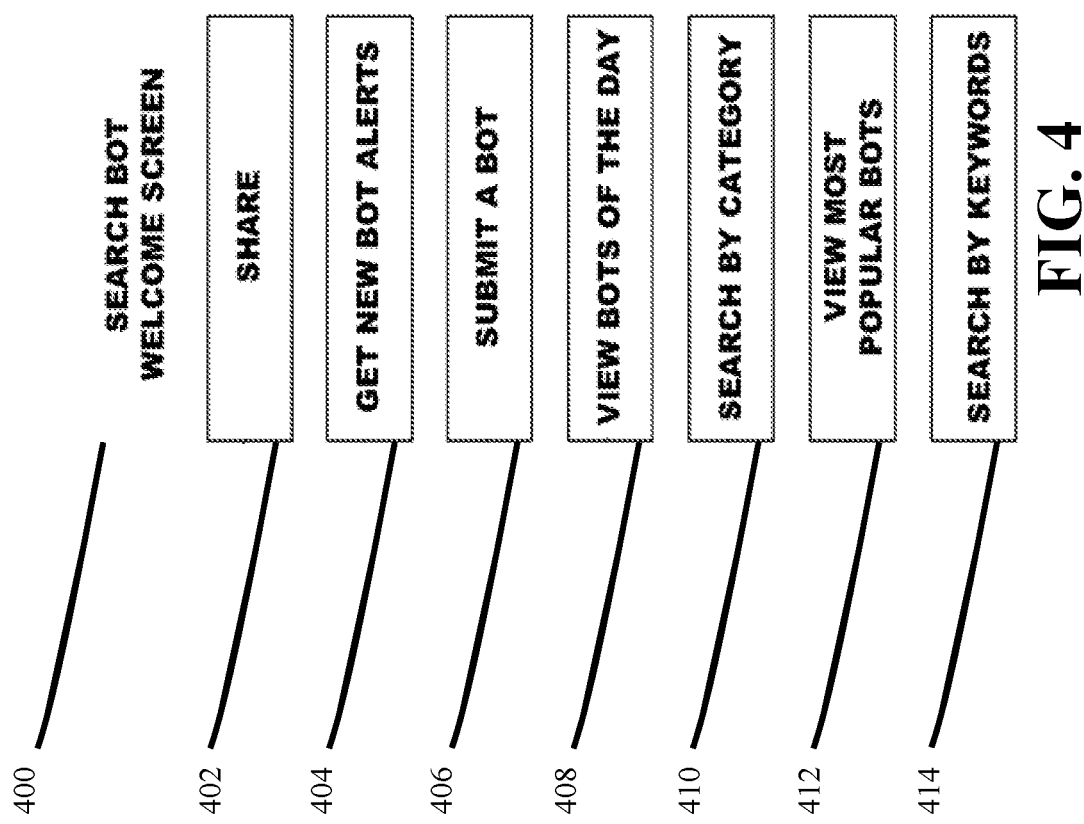
FIG. 4 illustrates a search bot welcome screen graphical user interface, according to an embodiment.

FIG. 4 illustrates a search bot welcome screen 400, according to an embodiment. In FIG. 4, search bot welcome screen 400 includes a share button 402 allowing users to share search bot with other users through a link that may be posted on suitable portals such as social media (e.g., the analytics server may generate a link and transmit said link to a social networking website associated with the user); a get new bot alerts button 404 that sends a notification to users any time a new bot is available on the bot directory; a submit a bot button 406 that allows users to send one or more bots to one or more application managers for analysis and, if appropriate, to be added to the bot directory; a view bots of the day button 408 displaying preferred bots as selected by one or more application managers; a search by category button 410 that compiles an indexed list of bot categories for user perusal; a view most popular bots button 412 compiling a list of bots ranked in order based on user bot ratings; and a search by keywords option 414 that permits users to type any query that will prompt the search bot to search within the bot directory or, if necessary, the web servers in order to provide the requested bot content.

Figure 5:
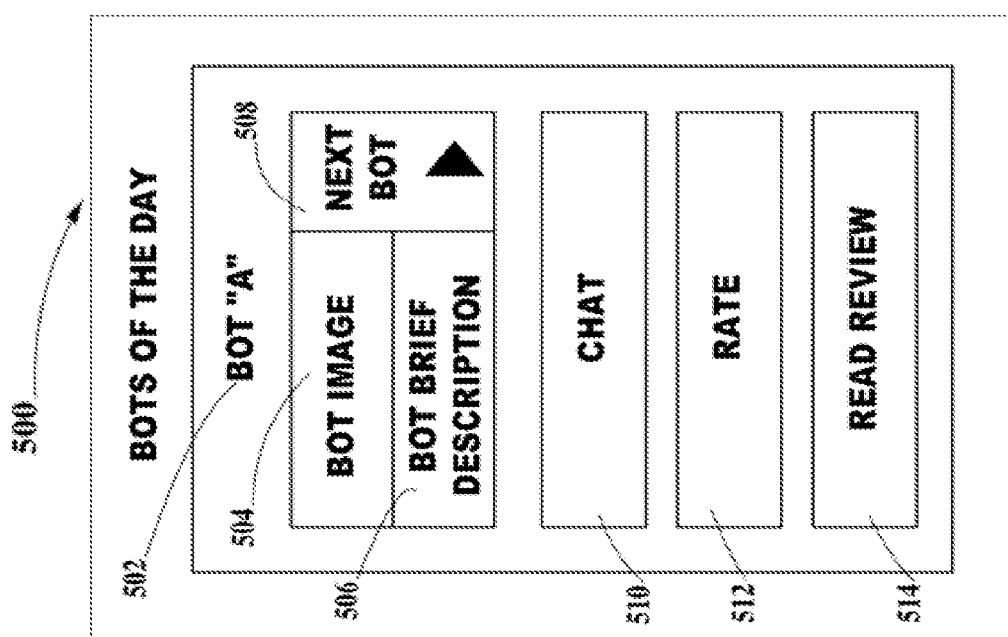
FIG. 5 illustrates a bots of the day screen graphical user interface, according to an embodiment.

FIG. 5 illustrates a bots of the day screen 500, according to an embodiment. Bots of the day screen 500 includes a bot name 502; a bot image 504 followed by a bot brief description 506; a next bot button 508; and options to chat 510 with the current bot, rate 512 the current bot, or read a review 514 about the current bot. When selecting next bot button 508, a screen is displayed to the users including similar information for a next, different bot, including a layout similar to that of bots of the day screen 500. For example, if the current bot is bot "A" clicking on next bot button 508 will show a bot "B" with similarly laid out information corresponding to bot "B". In some embodiments, the bots in bots of the day screen 500 are indexed in alphabetical order. When clicking on chat button 510, a new chat window may open up on the same application (e.g. a chat application), allowing the user to start interaction with selected bot. Rate button 512 allows users to evaluate the bots, as bot rankings may be used for selecting most popular bots (illustrated in FIG. 3). Read a review button 514 permits users to read comments other users have added to a bot based on user experience.

Figure 6:
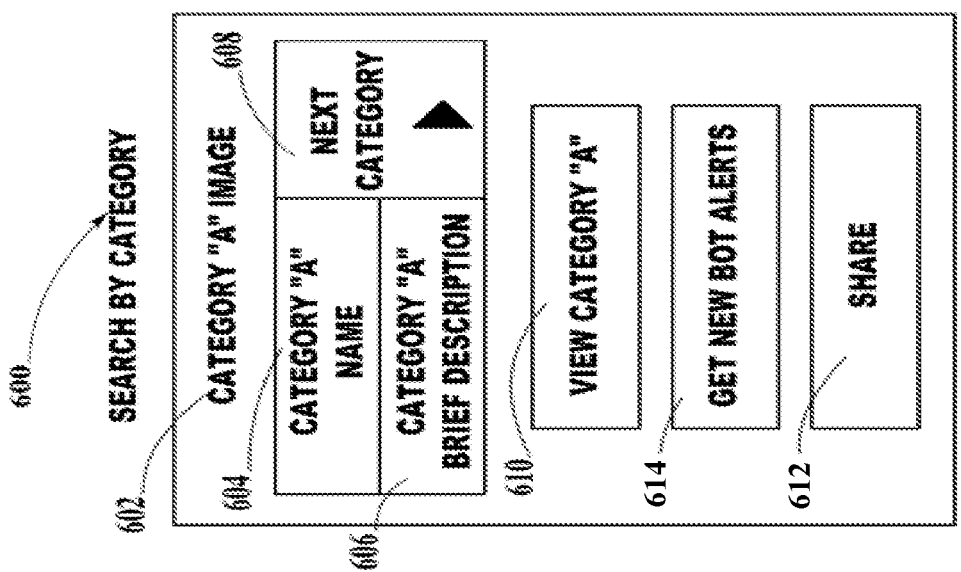
FIG. 6 illustrates a search by category screen graphical user interface, according to an embodiment.

FIG. 6 illustrates a search by category screen 600. In FIG. 6, search by category screen 600 includes a category image 602; a category name 604 followed by a category brief description 606; a next category button 608; a view category button 610; a get new bot alerts button 614 that sends a notification to the users any time a new bot is available on the bot directory; and a share button 612 allowing the users to share a particular search bot with other users through a link that may be posted on suitable portals such as social media. When selecting next category button 608, a screen is displayed to the users including similar information for a next, different category, including a layout similar to that of search by category screen 600. For example, if the current category is category "A", clicking on next category button 608 will show a category "B" with similarly laid out information corresponding to category "B". It is important to note that categories within search by category screen 600 are indexed in alphabetical order. When selecting view category 610, a screen is displayed to the users that includes information on each of bot in the selected category indexed in alphabetical order. Information regarding these bots 116 is displayed on individual screens including elements mentioned in bots of the day screen 500 in FIG. 5. A user may keep searching for new bots 116 within that category by clicking on next bot button 508, or may have an option to quit that category (not shown) and go back to search by category screen 600 to keep browsing for other categories.

Figure 7:
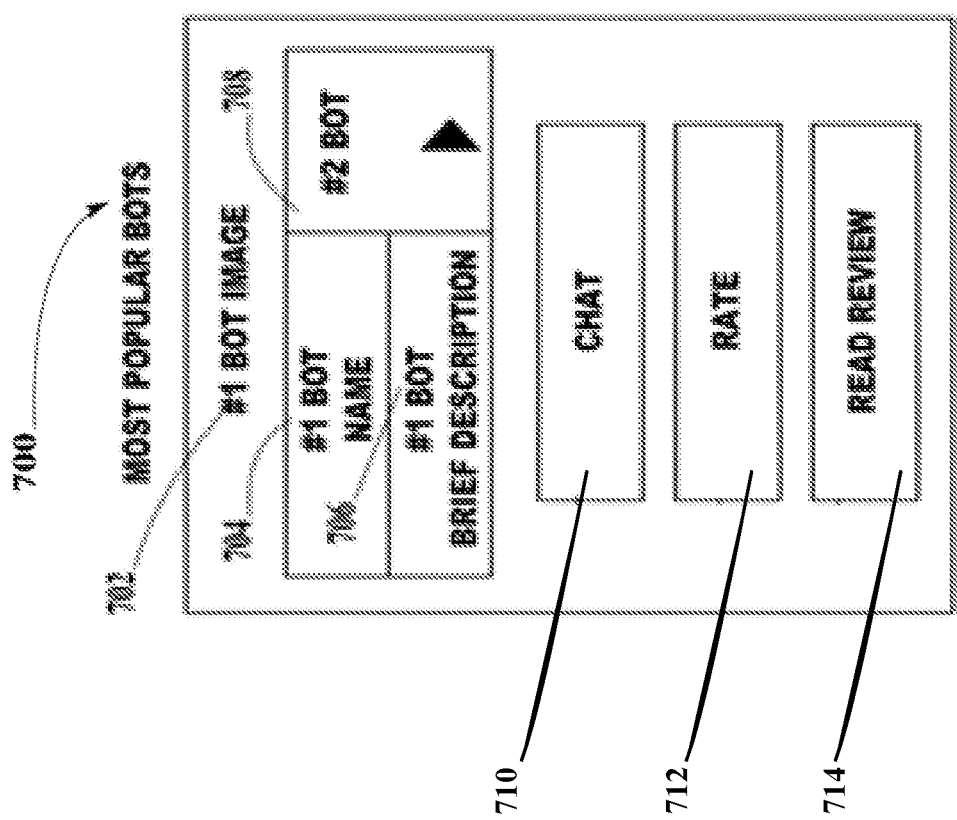
FIG. 7 illustrates a most popular bots screen graphical user interface, according to an embodiment.

FIG. 7 illustrates a most popular bots screen 700, according to an embodiment. In FIG. 7, most popular bots screen 700 includes a popular bot image 702; a popular bot name 704 followed by a popular bot brief description 706; a next popular bot button 708; and options to chat 710 with the current bot, rate 712 the current bot, or read a review 714 about the current bot. When selecting next popular bot button 708, a screen is displayed to the users including similar information for a next, different popular bot, including a layout similar to that of most popular bots screen 700. For example, if the current bot is "#1 bot", clicking on next popular bot button 708 will show a "#2 bot" with similarly laid out information corresponding to "#1 bot". It is important to note that bots 116 in most popular bots screen 700 are indexed in alphabetical order. As explained in FIG. 4, rate button 712 allows users to evaluate different bots. Ratings may be done assigning a numerical value for a bot. Information from this evaluation may be employed as ranking categorization and display order of bots in the most popular bots screen 700. According to an embodiment, rating scale goes from higher to lower number of points, where a higher number represents a higher rank for a bot and a lower number represents a lower rank for a bot.

Figure 8:
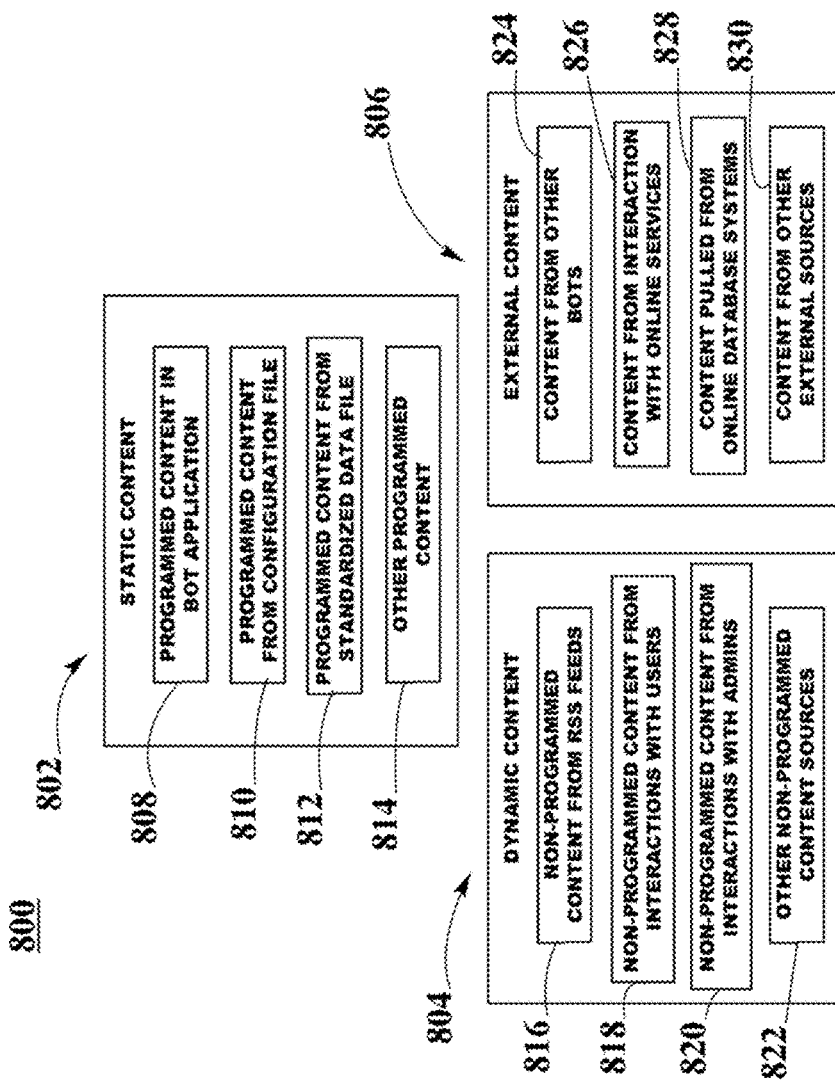
FIG. 8 illustrates content categories that each bot delivers to users upon request, according to an embodiment.

FIG. 8 illustrates a classification of bot content 800, according to an embodiment. Bot content includes static content 802, dynamic content 804, and external content 806. Static content 802 is content that has been specifically programmed into a particular bot. This may include, for example content that is programmed into the bot application 808 itself, programmed content from configuration files 810, programmed content from standards based files 812 such as AIML (Artificial Intelligence Markup Language) or XML (eXtensible Markup Language), or other types of programmed content 814. Dynamic content 804 is generally not specifically programmed into any particular bot. Instead, dynamic content 804 is typically gathered and integrated over time using a variety of means. Dynamic content 804 may be collected, for example, from RSS (Really Simple Syndication) feeds, from interactions with users 818, from interactions with an application administrator 820, or from other non-programmed content sources 822. External content 806 may include, for example, content received through interactions with other bots 824, content received through interactions with a broad range of online services 826, which make APIs available through which information and service may be accessed, content pulled from any of a variety of database systems 828, and content from other external sources 830. External content 806 may be accessed using an online resource API, which exposes resources contained on Web servers 120.

Figure 9:
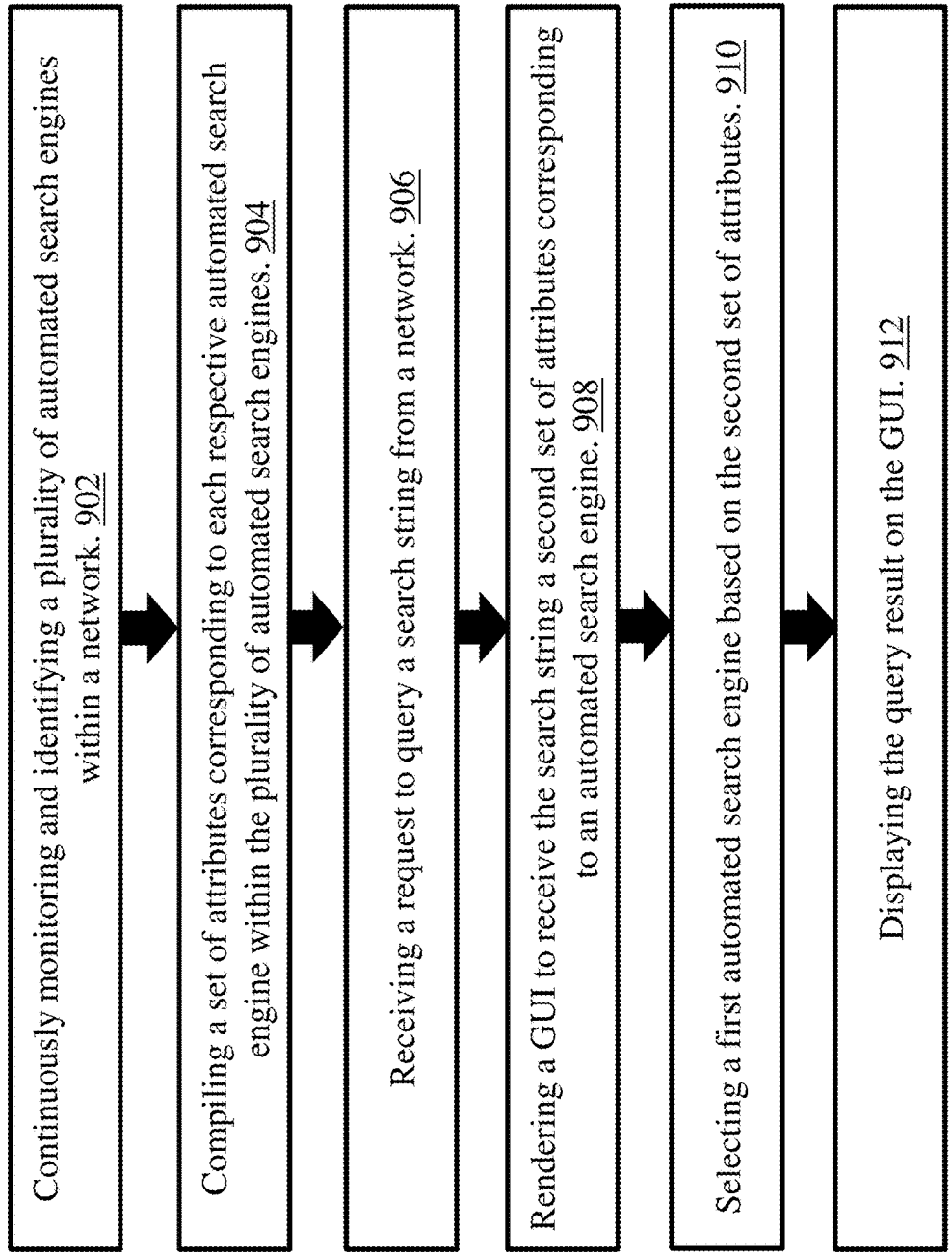
FIG. 9 illustrates operational steps for providing an automated agent search engine, according to an embodiment.

FIG. 9 illustrates operational steps for providing an automated agent search engine, according to an embodiment. Steps of the method 900 may be implemented using one or more modules of the analytics server, the search bot, and all the components described in FIG. 1. One skilled in the relevant art will appreciate that FIG. 9 does not imply any limitations with regard to the environments or embodiments that may be implemented. Modifications to the depicted environment or embodiment shown in FIG. 9 may be made without deviating from the methods disclosed herein.

At step 902, the analytics server may continuously monitor and identify a plurality of automated search engines within a network (e.g., search bots configured to search different terms within a network such as the Internet). As described in FIG. 1, the analytics server may continuously query different databases, examine different web documents, and/or web crawl to identify the existence of different automated search engines. The analytics server may be directly or indirectly connected to one or more databases or web crawl one or more web documents and web pages to identify different automated search agents (e.g., chatbot, natural language search bots, and the like) being used by different users to conduct searches.

At step 904 the analytics server may compile a set of attributes corresponding to each respective automated search engine within the plurality of automated search engines. The analytics server may compile different attributes associated with the each identified automated search engine. Non-limiting examples of different search engine attributes may include subject matter (e.g., a search engine for different restaurants or a search engine with natural language ability tailored towards news and current events, and the like), demographics (e.g., an automated search engine that is tailored towards young adults), data source or affiliations (e.g., an automated search agent that is generated and maintained by a new agency), user comments (e.g., user comments and ratings). In some embodiments, the analytics server may generate and store an index table of all the automated search engines, which contains a list of all the search engines and their corresponding attributes. The analytics server may continuously update this table. The index table may be utilized for faster search time and more efficient/accurate processing and retrieving of different automated search engines.

At step 906, the analytics server may receive, from a client computing device operated by a user, a request to query a search string from the network, wherein the search string comprises a first plurality of alphanumerical characters arranged in a manner consistent with a natural language arrangement. The analytics server may display a GUI, such as search bot welcome screen 400 or bot content search GUI 300 on a mobile device operated by a user. Upon displaying the above-mentioned GUI, the analytics server may receive an indication that the user is interested in conducting an online search using one of the identified automated search engines. As described above, the user may elect to "chat" with the automated search engine (e.g., use natural language to convey the search terms).

At step 908, upon receiving the request, the analytics server may render a graphical user interface displayed on the client computing device comprising at least a first component configured to receive the search string and at least a second component configured to receive a second set of attributes corresponding to at least one automated search engine within the plurality of automated search engines. The analytics server may display a GUI that is configured to receive search terms from the user. The GUI may include a text field that is configured to receive complete sentence (using natural language) from the user. The GUI may also receive one or more attributes associated with a desired automated search engine. For example, the user may elect to search the "search string" using the "most popular bot" or "bot of the day." In some embodiments, the user may also choose an automated based on a category of search (e.g., subject matter of the automated search engine as described above).

At step 910, upon receiving the second set of attributes corresponding to at least one automated search engine from the client computing device via the graphical user interface, the analytics server may select a first automated search engine from the plurality of automated search engines with a first set of attributes that corresponds to the second set of attributes received from the client computing device via the graphical user interface; furthermore, upon receiving the search string from the client computing device via the graphical user interface, the analytics server may transmit an instruction to the first automated search engine, to query the network for the search string. The analytics server may select an automated search engine (from the complied list of automated search engines) based on the attributes received from the user (step 908). For example, if the analytics server receives an indication that the user is requesting a bot of the day, the analytics engine may transfer the search string (the search terms or the natural language search terms received form the user) to an automated search engine assigned to that particular day. The analytics engine may utilize the index table (described above) to search for the automated search engine that matches the attributes received from the user. In a non-limiting example, the user indicates a desire for an automated search engine that utilizes natural language with a focus on the news industry; the analytics server may then select an automated search engine that matches those attributes. Upon selecting at least one automated search engine, the analytics server may transfer the search string (received from the user via the GUI) to the automated search engine. The analytics server may utilize variety of existing technology to transfer the search string to the selected automated search engine. For example, the analytics server may use an API connected to the automated search engine to transfer the search string or may pre-populate a user interface associated with the selected automated search engine with the search string. The analytics server may also generate and transmit an instruction to the selected automated search engine to conduct a search using the search string transferred by the analytics server.

At step 912, the analytics server may receive a response string from the first automated search engine, wherein the response string comprises a second plurality of alphanumerical characters arranged in the manner consistent with the natural language arrangement; furthermore, the analytics server may update the graphical user interface displayed on the client computing device to display the response string. The analytics server may receive a search result from the selected automated search engine and may transfer said search result to the user's mobile device (e.g., to be displayed by the application executing on the user's mobile device). Simply put, the analytics server may act as a middleware between the user's mobile device (and the search application executing on the user's mobile device) and one or more automated search engines. Furthermore, the analytics server may use the above-mentioned platforms to facilitate a conversation between the user and the automated search engines. For example, upon displaying the search result on the user's mobile device, the user may also have a follow up question or additional search strings. In those embodiments, the user may also user the GUI components (e.g., text fields displayed by the search application on the user's mobile device) to transmit the search string to the analytics server and eventually to the automated search engine in order to receive additional search results.

Figure 10:
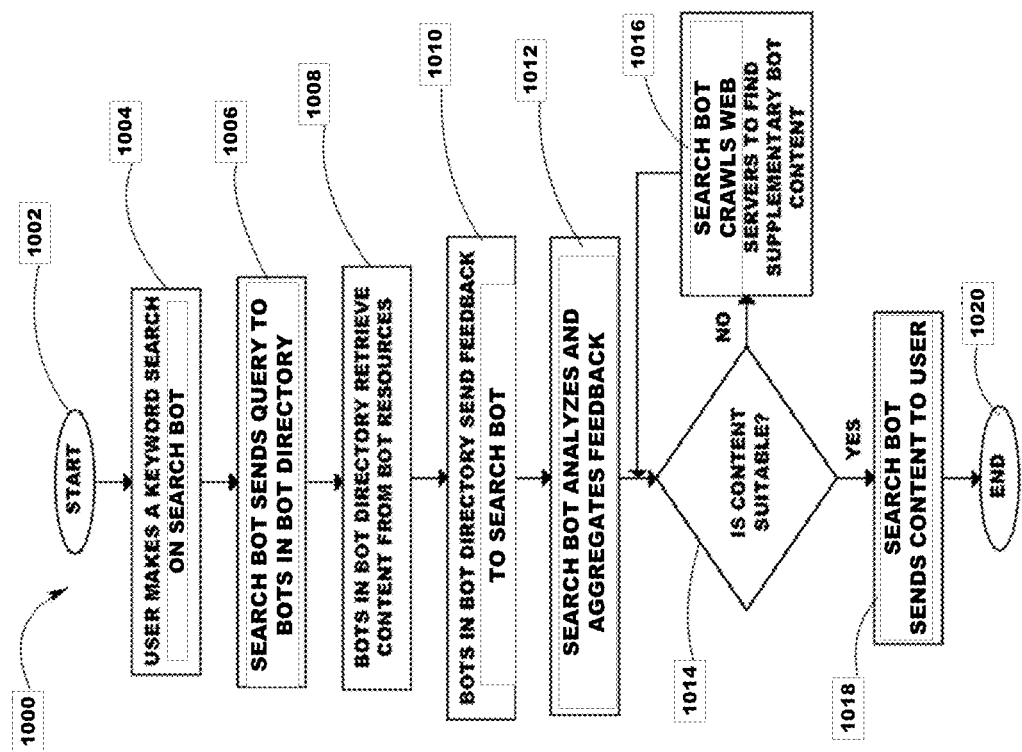
FIG. 10 illustrates a content aggregation method, according to an embodiment.

FIG. 10 illustrates a content aggregation method 1000, according to an embodiment. In operation, the analytics server controls the functional behavior and operation of the search bot and provides various GUI's described in FIG. 3-FIG. 7. Therefore, analytics server and search bot have been interchangeably used herein. Content aggregation method 1000 starts at 1002 when a user makes a keyword search on the search bot 1004. This keyword search may include any suitable subject related to images, videos, news, maps, hobbies, networking, virtual queues, reservations, and more. Subsequently, the search bot may transmit the query to bots in bot directory 1006, which includes a direct communication between the search bot and different bots identified by the search bot for suitable content retrieval. When the search bot transmits the query to bots in the bot directory, bots in bot directory retrieve information from bot resources 1008, which may include any content that has been programmed on bots.

After retrieving information, different bots selected form the bot directory may transmit feedback to the search bot. The order and speed at which individual bots in bot directory transmit feedback to the search bot may vary depending on each individual bot design, nature of the query, and available bot resources, amongst other factors. After the search bot receives feedback from different bots, the search bot analyzes and aggregates feedback 1012, implying utilization of query results aggregation algorithms to verify quality of content. Query results aggregation usually includes a basic intersection of information provided by each bot with the actual query, extracting quality signals, which implies checking a level of correspondence between the query and the provided content, and ranking content, amongst other steps. Content aggregation method 1000 may then check whether the content is suitable 1014 to be provided to the user. In some embodiments, the search bot may use natural language parsing to parse the search terms (e.g., what the user has searched) and the feedback in order to analyze the feedback and determine whether the feedback satisfies a quality threshold. The search bot may match the subject matter of the search terms with the feedback and determine whether the feedback satisfies the quality threshold. For example, the search bot may parse all the search terms and determine that the user has searched for a location; the search bot may also parse and analyze the feedback and determine that the feedback does not include a location or an address. The search bot may then determine that the feedback does not satisfy the quality threshold. In an embodiment, the search bot may match a number of requested items with the number of provided items and determine whether the quality threshold has been satisfied. In a non-limiting example, the user may ask for a specific number of items (e.g., "what are the top five Italian restaurants in Dallas?") and the search bot may only detect four restaurants within the feedback. Consequently, the search bot may determine that the quality threshold has not been satisfied. In negative case (i.e., when the quality threshold has not been satisfied), the search bot may web crawl web servers (or other websites and webpages within the network) to find supplementary content (step 1016). The search bot may also communicate with others bots within the bot directory (as described in FIG. 1) and instruct the bots to conduct the search using the search terms received from the user in step 1002. The search bot may provide the feedback (from web crawling or querying other bots) to the user. For example, the search bot may update or render a GUI displayed on the user's computing device to display the feedback from the first search and the additional information received (supplementary content described in step 1016). If the search bot determines that the feedback satisfies the quality threshold, the search bot may display the feedback (step 1018) and content aggregation method 1000 may end (step 1020)

Figure 11:
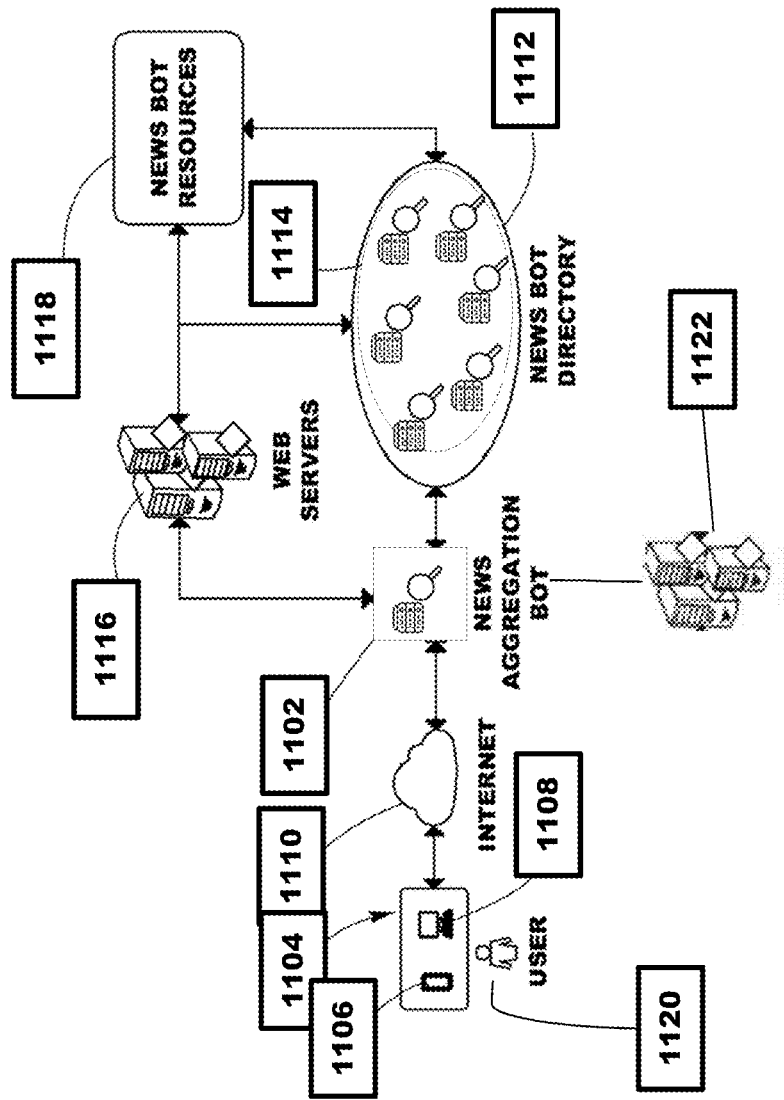
FIG. 11 illustrates an example of search bot being utilized as a news aggregation bot, according to an embodiment.

FIG. 11 illustrates an architectural diagram of a search bot system 100 being employed, according to an embodiment. In FIG. 11 a user 1120 may use suitable computing devices 1104 including a mobile device 1106 or PC 1108 to connect to Internet 1110 and initiate communication with the search bot, specifically searching for news. Thus, user 1120 may simply need to type a keyword search in news aggregation bot 1102 and let news aggregation bot 1102 retrieve relevant news by utilizing content aggregation method 1000 described in FIG. 10. News aggregation bot 1102 is configured to search in a news bot directory 1112 and communicate with news bots 1114 in order to retrieve and analyze news bot content that may be required to respond to user queries, and present this news bot content in the form of search results to users 1120. Initially, news bots 1114 in news bot directory 1112 may search for required news content in news bot resources 1118, which refers to a data repository that includes any functionality enabling news bots 1114 to provide relevant news content to a user 1120 through news aggregation bot 1102.

According to an embodiment, in a situation where individual news bots 1114 are not available in news bot directory 1112, news aggregation bot 1102 may also be configured to crawl Web resources, such as Web servers 1116, for finding requested news content. Likewise, in case some news bots 1114 are not able to provide desired content, news bot directory 1112 and hence news bots 1114 within are also connected to web servers 1116, allowing said news bots 1114 to crawl web sources and retrieve new news bot resources 1118 that may comply with user requests. News bot directory 1114 is kept constantly updated by one or more application managers (not shown) performing news bot searches on web servers 1116, by automatic news bot searches performed periodically on web servers 1116, or by submission from users 1120 sending news bots 1102 for review to one or more application managers.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for querying a network using one or more automated search engines using an automated agent search engine, the method comprising:

continuously monitoring and identifying, by a server, a plurality of automated search engines within a network, wherein each automated search engine is configured to query the network for content corresponding to a search term;

compiling, by the server, a set of attributes corresponding to each respective automated search engine within the plurality of automated search engines;

generating, by the server, an index table comprising the plurality of the automated search engines and their respective set of attributes;

receiving, by the server, from a client computing device operated by a user and via an application executing on the client computing device, a request to query a search string from the network and a second set of attributes;

upon identifying a first automated search engine from the plurality of automated search engines with a first set of attributes that corresponds to the second set of attributes, transmitting, by the server, an instruction to the first automated search engine to query the network for the search string;

receiving, by the server, a response string from the first automated search engine, wherein the response string comprises a plurality of alphanumerical characters arranged in the manner consistent with dialog;

determining, by the server, whether the response string satisfies a threshold;

when the response string satisfies the threshold:
   instructing, by the server, the application to update the first graphical user interface component of the graphical user interface displayed on the client computing device to display the response string; and when the response string does not satisfy the threshold:
   at least one of web crawling one or more webpages based on the search string, querying the one or more websites, and instructing at least a second automated search engine to search the network for the search string,
   receiving, by the server, a second response string to the at least one of the web crawling, querying the one or more websites, and instructing the second automated search engine,
   instructing, by the server, the application to update the first graphical user interface component of the graphical user interface displayed on the client computing device to display the second response string.

2. The method of claim 1, further comprising:
storing, by the server, the index table in the database.

3. The method of claim 1, further comprising:
periodically updating, by the server, the index table based on any additional data identified when continuously monitoring the plurality of automated search engines.

4. The method of claim 1, wherein the application is operated and functionally controlled by the server.

5. The method of claim 1, wherein the second set of attributes corresponds to a subject matter associated with at least one automated search engine within the plurality of search engines.

6. The method of claim 1, wherein the second set of attributes corresponds to a rating associated with at least one automated search engine within the plurality of search engines.

7. The method of claim 6, wherein the rating value corresponds to a plurality of rating values received from previous users who have conducted searches using the at least one automated search engine within the plurality of search engines.

8. The method of claim 1, further comprising:
displaying, by the server, the first set of attributes on the client computing device.

9. The method of claim 1, wherein the network is a private network.

10. The method of claim 1, wherein the second set of attributes corresponds to a bot of the day selected at random for each day by the server.

11. A computer system comprising:
a client computing device operated by a user configured to execute an application and:
   receive, via the application, a request to query a search string from the network, wherein the search string comprises a first plurality of alphanumerical characters arranged in a manner consistent with a dialog; and
   transfer the search string to a server;
a plurality of automated search engines within a network, wherein each automated search engine is configured to query the network for content corresponding to a search term;

a server coupled to the plurality of automated search engines, the application, and the client computing device, wherein the server comprises a processor and a non-transitory computer readable medium comprising instructions that are configured to be executed by the processor to:
continuously monitor and identify the plurality of automated search engines within a network;
compile a set of attributes corresponding to each respective automated search engine within the plurality of automated search engines;
generate an index table comprising the plurality of the automated search engines and their respective set of attributes;
receive, from the client computing device, a request to query a search string from the network and a second set of attributes;
upon identifying a first automated search engine from the plurality of automated search engines with a first set of attributes that corresponds to the second set of attributes, transmit an instruction to the first automated search engine to query the network for the search string;
receive a response string from the first automated search engine, wherein the response string comprises a plurality of alphanumerical characters arranged in the manner consistent with dialog;
determine whether the response string satisfies a threshold;
when the response string satisfies the threshold:
   instruct the application to update the first graphical user interface component of the graphical user interface displayed on the client computing device to display the response string; and
when the response string does not satisfy the threshold:
   at least one of web crawl one or more webpages based on the search string and instruct at least a second automated search engine to search the network for the search string,
   receive a second response string to the at least one of the web crawling and instructing the second automated search engine,
   instruct the application to update the first graphical user interface component of the graphical user interface displayed on the client computing device to display the second response string.

12. The method of claim 1, wherein the computer readable medium further comprises an instruction to:
store the index table in the database.

13. The method of claim 1, wherein the computer readable medium further comprises an instruction to:
periodically update the index table based on any additional data identified when continuously monitoring the plurality of automated search engines.

14. The method of claim 1, wherein the application is operated and functionally controlled by the server.

15. The method of claim 1, wherein the second set of attributes corresponds to a subject matter associated with at least one automated search engine within the plurality of search engines.

16. The method of claim 1, wherein the second set of attributes corresponds to a rating associated with at least one automated search engine within the plurality of search engines.

17. The method of claim 6, wherein the rating value corresponds to a plurality of rating values received from previous users who have conducted searches using the at least one automated search engine within the plurality of search engines.

18. The method of claim 1, wherein the computer readable medium further comprises an instruction to:
   display the first set of attributes on the client computing device.

19. The method of claim 1, wherein the network is a private network.

20. The method of claim 1, wherein the second set of attributes corresponds to a bot of the day selected at random for each day by the server.

* * * * *